(12) United States Patent
Ogawa

(10) Patent No.: US 10,087,956 B2
(45) Date of Patent: Oct. 2, 2018

(54) ACTUATOR UNIT

(71) Applicant: KAYABA INDUSTRY CO., LTD., Tokyo (JP)

(72) Inventor: Takayuki Ogawa, Kanagawa (JP)

(73) Assignee: KYB Corporation, Tokyo (JP)

( * ) Notice: Subject to any disclaimer, the term of this patent is extended or adjusted under 35 U.S.C. 154(b) by 257 days.

(21) Appl. No.: 14/764,723

(22) PCT Filed: Jan. 23, 2014

(86) PCT No.: PCT/JP2014/051351
§ 371 (c)(1),
(2) Date: Jul. 30, 2015

(87) PCT Pub. No.: WO2014/125887
PCT Pub. Date: Aug. 21, 2014

(65) Prior Publication Data
US 2015/0369263 A1    Dec. 24, 2015

(30) Foreign Application Priority Data

Feb. 18, 2013 (JP) ................. 2013-028534

(51) Int. Cl.
*F15B 11/12* (2006.01)
*F15B 11/10* (2006.01)
(Continued)

(52) U.S. Cl.
CPC .............. *F15B 11/10* (2013.01); *B61F 5/24* (2013.01); *B61F 5/245* (2013.01); *F16F 9/19* (2013.01);
(Continued)

(58) Field of Classification Search
CPC .......... F15B 2211/30565; F15B 11/121; F15B 2211/7653
(Continued)

(56) References Cited

U.S. PATENT DOCUMENTS 2,895,455 A * 7/1959 Clowes .............. B60H 1/00442
91/357
2,954,755 A * 10/1960 Pecchenino .......... F15B 11/121
91/357
(Continued)

FOREIGN PATENT DOCUMENTS

DE    3811312 A1    10/1989
JP    S59/1050 U    1/1984
(Continued)

*Primary Examiner* — F. Daniel Lopez
*Assistant Examiner* — Matthew Wiblin
(74) *Attorney, Agent, or Firm* — Rabin & Berdo, P.C.

(57) ABSTRACT

An actuator unit includes two chambers defined in the cylinder; a supply passage allowing a working fluid discharged from the pump to be supplied to the two chambers; a discharge passage allowing the two chambers to communicate with the tank; a direction control valve configured to selectively communicate each of the two chambers with one of the pump and the tank; a control passage that branches from the supply passage on a side of the pump rather than the direction control valve so as to communicate the pump with the tank; a variable relief valve provided on the control passage, the variable relief valve opening so as to allow the working fluid to flow from the supply passage toward the tank when a pressure in the supply passage reaches the valve opening pressure; and a center passage that communicates the tank with an interior of the cylinder.

8 Claims, 4 Drawing Sheets

(51) Int. Cl.
  *B61F 5/24* (2006.01)
  *F16F 9/19* (2006.01)
(52) U.S. Cl.
  CPC ... *F15B 11/121* (2013.01); *F15B 2211/30505* (2013.01); *F15B 2211/30565* (2013.01); *F15B 2211/40* (2013.01); *F15B 2211/50518* (2013.01); *F15B 2211/5157* (2013.01); *F15B 2211/526* (2013.01); *F15B 2211/8613* (2013.01)
(58) Field of Classification Search
  USPC .......................................... 91/357, 402, 455
  See application file for complete search history.

(56) References Cited

U.S. PATENT DOCUMENTS

| | | | | | |
|---|---|---|---|---|---|
| 3,253,515 | A | * | 5/1966 | Wilkinson | F15B 21/041 91/401 |
| 3,470,792 | A | * | 10/1969 | Darling | F15B 15/224 91/396 |
| 4,308,018 | A | * | 12/1981 | Nakamura | B63H 20/10 440/61 G |
| 5,217,245 | A | * | 6/1993 | Guy | B60G 21/0556 280/124.152 |
| 5,549,328 | A | * | 8/1996 | Cubalchini | B60G 17/0162 280/5.511 |
| 5,960,695 | A | * | 10/1999 | Aardema | F15B 11/006 137/596.17 |
| 7,219,592 | B2 | * | 5/2007 | Nielsen | F15B 11/024 91/437 |
| 7,690,196 | B2 | * | 4/2010 | Nielsen | F15B 11/003 60/444 |
| 2011/0192157 | A1 | * | 8/2011 | Ogawa | B61F 5/245 60/469 |

FOREIGN PATENT DOCUMENTS

| | | |
|---|---|---|
| JP | 2008-049907 A | 3/2008 |
| JP | 2010-065797 A | 3/2010 |
| JP | 2011-202675 A | 10/2011 |

* cited by examiner

ACTUATOR UNIT

TECHNICAL FIELD

The present invention relates to an actuator unit.

BACKGROUND ART

An actuator unit is used in a railway vehicle, for example, by being interposed between a vehicle body and a truck in order to suppress left-right direction vibration relative to an advancing direction of the vehicle body.

JP2010-65797A discloses an actuator unit including: a cylinder; a piston slidably inserted into the cylinder; a rod inserted into the cylinder and coupled to the piston; a rod side chamber and a piston side chamber defined within the cylinder by the piston; a tank; a first opening/closing valve provided on midway of a first passage that communicates the rod side chamber with the piston side chamber; a second opening/closing valve provided on midway of a second passage that communicates the piston side chamber with the tank; a pump that is configured to supply a working fluid to the rod side chamber; a motor that is configured to drive the pump; an exhaust passage that communicates the rod side chamber to the tank; and a variable relief valve provided on midway of the exhaust passage.

According to this actuator unit, a direction of thrust output thereby is determined by opening and closing the first opening/closing valve and the second opening/closing valve appropriately. By rotating the pump at a fixed speed using the motor, a constant flow is supplied into the cylinder, and meanwhile, by adjusting a relief pressure of the variable relief valve, a pressure in the cylinder is controlled. As a result, the actuator unit described above can output thrust of a desired magnitude in a desired direction.

SUMMARY OF INVENTION

To suppress lateral direction vibration of a vehicle body of a railway vehicle using the actuator unit disclosed in JP2010-65797A, lateral direction acceleration of the vehicle body is detected using an acceleration sensor, and the actuator unit is caused to output thrust that counterbalances the detected acceleration. In so doing, the vibration of the vehicle body can be suppressed. In this case, when the railway vehicle travels in a curved section, for example, steady acceleration acts on the vehicle body, and as a result, the thrust output by the actuator unit may become extremely large due to effects from noise and drift input into the acceleration sensor.

The vehicle body of the railway vehicle is supported by a bogie using an air spring or the like. In a bolsterless truck, when the vehicle body swings in the lateral direction relative to the bogie, the air spring generates a reaction force for returning the vehicle body to the center.

When the railway vehicle travels in a curved section such that the vehicle body swings relative to the truck, and the actuator unit generates a large thrust in a direction for returning the vehicle body to a neutral position due to the effects of noise and drift, the air spring generates a reaction force in an identical direction. Hence, the force for returning the vehicle body to the neutral position becomes excessive such that the vehicle body passes the neutral position and displaces to an opposite side, and as a result, it may be difficult to converge the vibration of the vehicle body.

An object of the present invention is to provide an actuator unit that is capable of suppressing vibration of a vibration damping subject with stability.

According to one aspect of the present invention, an actuator unit includes a cylinder; a piston slidably inserted into the cylinder, the piston defining two chambers in the cylinder; a rod inserted into the cylinder and coupled to the piston; a tank; a pump; a supply passage provided between the pump and each of the two chambers so as to allow a working fluid discharged from the pump to be supplied to the two chambers; a discharge passage provided between each of the two chambers and the tank so as to allow the two chambers to communicate with the tank; a direction control valve configured to selectively communicate each of the two chambers with one of the pump and the tank by allowing and blocking communication between the corresponding chambers and one of the supply passage and the discharge passage; a control passage that branches from the supply passage on a side of the pump rather than the direction control valve so as to communicate the pump with the tank; a variable relief valve provided on the control passage, the variable relief valve being configured to be varied a valve opening pressure, the variable relief valve opening so as to allow the working fluid to flow from the supply passage toward the tank when a pressure in the supply passage reaches the valve opening pressure; and a center passage that communicates the tank with an interior of the cylinder.

DESCRIPTION OF EMBODIMENTS

Figure 1:
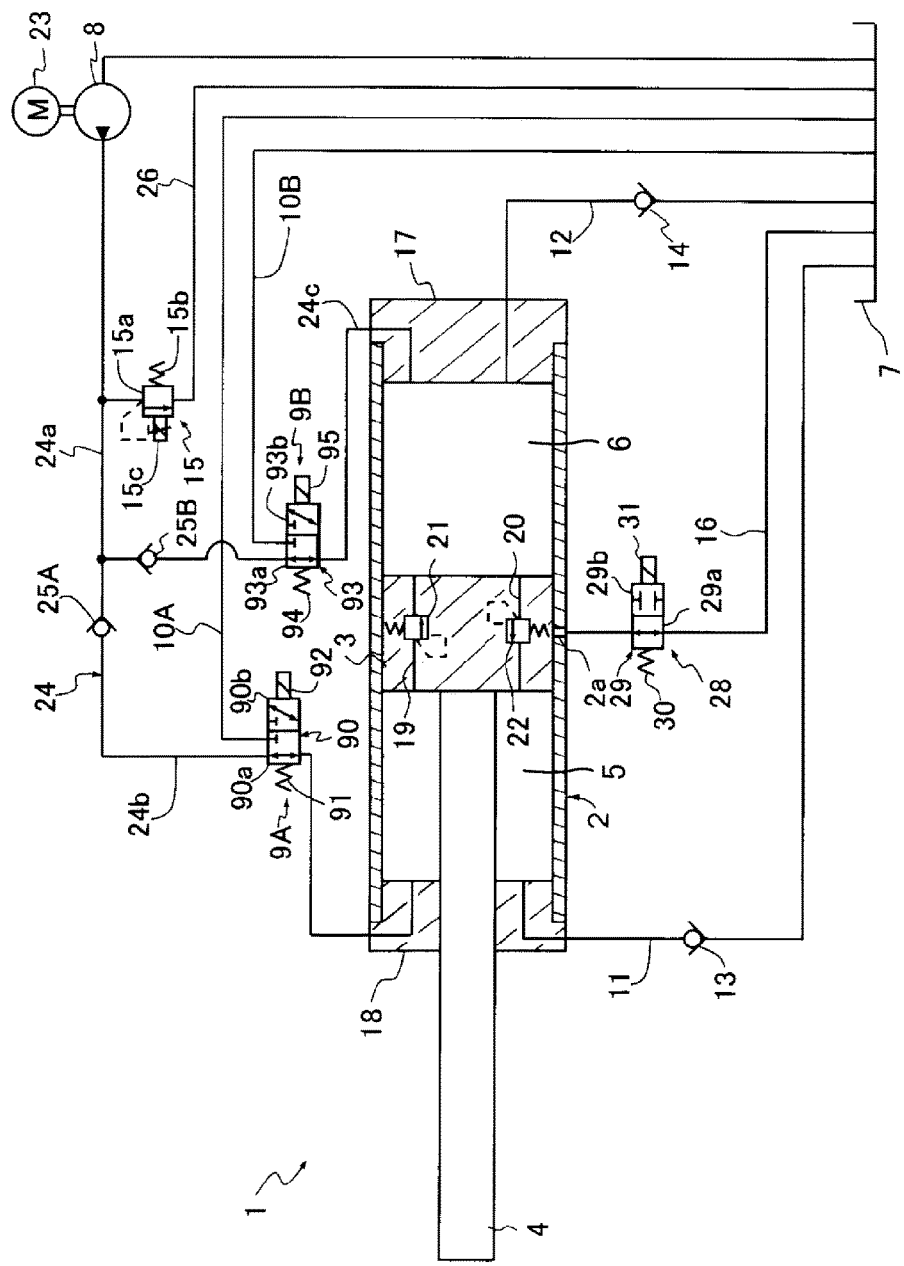
FIG. 1 is a schematic view of an actuator unit according to an embodiment of the present invention.

An embodiment of the present invention will be described below with reference to the attached figures. As shown in FIG. 1, an actuator unit 1 according to this embodiment of the present invention includes a cylinder 2; a piston 3 slidably inserted into the cylinder 2, the piston 3 defining two chambers (a rod side chamber 5 and a piston side chamber 6) in the cylinder 2; a rod 4 inserted into the cylinder 2 and coupled to the piston 3; a tank 7; a pump 8; a supply passage 24 provided between the pump 8 and the two chambers (the rod side chamber 5 and the piston side chamber 6) so as to allow a working fluid discharged from the pump 8 to be supplied to the two chambers (the rod side chamber 5 and the piston side chamber 6); discharge passages 10A, 10B provided between each of the two chambers (the rod side chamber 5 and the piston side chamber 6) and the tank 7 so as to allow the two chambers (the rod side chamber 5 and the piston side chamber 6) to communicate with the tank 7; direction control valves 9A, 9B configured to selectively communicate each of the two chambers (the rod side chamber 5 and the piston side chamber 6) with one of the pump 8 and the tank 7 by allowing and blocking communication between the corresponding chambers (rod side chamber 5 and the piston side chamber 6) and one of the supply passage 24 and the discharge passages 10A, 10B; a control passage 26 that branches from the supply passage 24 on a side of the pump rather than the direction control valves 9A, 9B so as to communicate the pump 8 with the tank 7; a variable relief valve 15 provided on midway of the control passage 26, the variable relief valve 15 being configured to be varied a valve opening pressure, the variable relief valve 15 opening so as to allow the working fluid to flow from the supply passage 24 toward the tank 7 when a pressure in the supply passage 24 reaches the valve opening pressure; and a center passage 16 that communicates the tank 7 with the interior of the cylinder 2. Working oil is charged into the two chambers (the rod side chamber 5 and the piston side chamber 6) as the working fluid. A gas is charged into the tank 7 in addition to the working oil. There is no particular need to set the tank 7 in a pressurized condition by charging the gas in a compressed condition. However, the tank 7 may be pressurized. The working fluid may be a fluid other than working oil, and may also be a gas.

To cause the actuator unit 1 to expand, the pump 8 is driven such that the working oil discharged from the pump 8 is supplied to the piston side chamber 6 by the direction control valve 9B, and the rod side chamber 5 is communicated with the tank 7 by the direction control valve 9A. The actuator unit 1 generates expansion direction thrust corresponding to a pressure in the piston side chamber 6 by adjusting the valve opening pressure of the variable relief valve 15. Conversely, to cause the actuator unit 1 to contract, the pump 8 is driven such that the working oil discharged from the pump 8 is supplied to the rod side chamber 5 by the direction control valve 9A, and the piston side chamber 6 is communicated to the tank 7 by the direction control valve 9B. The actuator unit 1 generates contraction direction thrust corresponding to a pressure in the rod side chamber 5 by adjusting the valve opening pressure of the variable relief valve 15.

Respective parts will now be described in detail. The cylinder 2 is formed in a tubular shape, wherein one end portion (a right end in FIG. 1) is closed by a lid 17 and wherein an annular rod guide 18 is attached to the other end portion (a left end in FIG. 1). The rod 4 slidably inserted into the cylinder 2 is slidably inserted into the rod guide 18. The rod 4 projects to the exterior of the cylinder 2 at one end, and the other end is coupled to the piston 3 slidably inserted into the cylinder 2.

A gap between an outer periphery of the rod 4 and the cylinder 2 is sealed by a seal member, not shown in the figures. As a result, the interior of the cylinder 2 is maintained in an airtight condition. As described above, the working oil is charged into the two chambers (the rod side chamber 5 and the piston side chamber 6) defined within the cylinder 2 by the piston 3.

Attachment portions, not shown in the figures, are provided respectively on a left end, in FIG. 1, of the rod 4 projecting to the exterior of the cylinder 2 and the lid 17 closing the right end of the cylinder 2. The actuator unit 1 is interposed between a vehicle body and a truck of a railway vehicle, by the attachment portions. The actuator unit 1 may also be interposed between a building and a foundation fixed to the ground, a beam of an uppermost floor and a beam of a lowermost floor of a building, and so on.

The rod side chamber 5 and the piston side chamber 6 serving as the two chambers defined by the piston 3 are communicated by an expansion side relief passage 19 and a contraction side relief passage 20 each of which is provided in the piston 3. An expansion side relief valve 21 that opens when the pressure in the rod side chamber 5 exceeds the pressure in the piston side chamber 6 by a predetermined amount, thereby opening the expansion side relief passage 19 such that the pressure in the rod side chamber 5 escapes into the piston side chamber 6, is provided on midway of the expansion side relief passage 19. A contraction side relief valve 22 that opens when the pressure in the piston side chamber 6 exceeds the pressure in the rod side chamber 5 by a predetermined amount, thereby opening the contraction side relief passage 20 such that the pressure in the piston side chamber 6 escapes into the rod side chamber 5, is provided on midway of the contraction side relief passage 20. By providing the expansion side relief valve 21 and the contraction side relief valve 22, it is possible to prevent the pressure in the cylinder 2 from becoming excessive, and as a result, the actuator unit 1 can be protected.

The rod side chamber 5 and the tank 7 communicate via a contraction side intake passage 11, and a check valve 13 is provided on midway of the contraction side intake passage 11. The check valve 13 allows the working fluid to flow only from the tank 7 toward the rod side chamber 5, and prevents the working fluid from flowing in an opposite direction.

The piston side chamber 6 and the tank 7 communicate via an expansion side intake passage 12, and a check valve 14 is provided on midway of the expansion side intake passage 12. The check valve 14 allows the working oil to flow only from the tank 7 toward the piston side chamber 6, and prevents the working oil from flowing in an opposite direction.

The pump 8 is driven by a motor 23 to discharge the working oil drawn from the tank 7. A discharge port of the pump 8 is capable of communicating with the rod side chamber 5 and the piston side chamber 6 via a supply passage 24. When driven by the motor 23, therefore, the pump 8 can suction the working oil from the tank 7 and supply the working oil to the rod side chamber 5 and the piston side chamber 6. Since the pump 8 discharges the working oil in only one direction, an operation to switch a rotation direction thereof is not required. Hence, a problem whereby a discharge amount varies when the rotation direction is switched does not arise, and therefore an inexpensive gear pump or the like may be used as the pump 8. Further, the motor 23 also need only rotate in one direction, and therefore the motor 23 does not require a high degree of responsiveness in relation to a rotation switch. Hence, an inexpensive motor may likewise be used as the motor 23.

The supply passage 24 includes a common passage 24a communicated with the discharge port of the pump 8, a first branch passage 24b that branches from the common passage 24a and is communicated with the rod side chamber 5, and a second branch passage 24c that likewise branches from the common passage 24a and is communicated to the piston side chamber 6. The control passage 26 that communicates with the tank 7 is connected to the common passage 24a midway. The direction control valves 9A, 9B and check valves 25A, 25B are provided on midway of the first branch passage 24b and midway of the second branch passage 24c, respectively. The discharge passages 10A, 10B communicating the rod side chamber 5 and the piston side chamber 6 with the tank 7 are connected respectively to the direction control valves 9A, 9B. Hereafter, the direction control valve provided on midway of the first branch passage 24b, from among the direction control valves 9A, 9B, will be referred to as a first direction control valve 9A, and the direction control valve provided on midway of the second branch passage 24c will be referred to as a second direction control valve 9B. Further, the discharge passage communicated with the first direction control valve 9A so as to communicate the rod side chamber 5 with the tank 7, from among the discharge passages 10A, 10B, will be referred to as a first discharge passage 10A, and the discharge passage communicated with the second direction control valve 9B so as to communicate the piston side chamber 6 to the tank 7 will be referred to as a second discharge passage 10B.

The first direction control valve 9A is a solenoid direction control valve. The first direction control valve 9A includes a valve main body 90 having a first position 90a and a second position 90b, communication with the first branch passage 24b being allowed so that the pump 8 communicates with the rod side chamber 5 but the first discharge passage 10A is blocked at the first position 90a, communication with the first branch passage 24b being blocked but communication with the first discharge passage 10A being allowed so that the rod side chamber 5 communicates with the tank 7 at the second position 90b; a spring 91 that is configured to bias the valve main body 90 so as to be positioned at the first position 90a; and a solenoid 92 which, when energized, switches the valve main body 90 to the second position 90b against a biasing force of the spring 91. When the solenoid 92 is not energized, therefore, the first direction control valve 9A takes the first position 90a.

The second direction control valve 9B is a solenoid direction control valve. The second direction control valve 9B includes a valve main body 93 having a first position 93a and a second position 93b, communication with the second branch passage 24c being allowed so that the pump 8 communicates with the piston side chamber 6 but the second discharge passage 10B is blocked at the first position 93a, communication with the second branch passage 24c being blocked but communication with the second discharge passage 10B being allowed so that the piston side chamber 6 communicates with the tank 7; a spring 94 that is configured to bias the valve main body 93 so as to be positioned at the first position 93a; and a solenoid 95 which, when energized, switches the valve main body 93 to the second position 93b against a biasing force of the spring 94. When the solenoid 95 is not energized, therefore, the second direction control valve 9B takes the first position 93a.

The check valves 25A, 25B are provided respectively in the first and second branch passages 24b, 24c on a side of the pump rather than the direction control valves 9A, 9B, and both allow the working oil to flow only from the pump 8 toward the cylinder 2 while preventing the working oil from flowing in an opposite direction.

The control passage 26 communicates the common passage 24a with the tank 7. The variable relief valve 15 is provided on midway of the control passage 26. The variable relief valve 15 includes a valve body 15a provided on midway of the control passage 26, a spring 15b that is configured to bias the valve body 15a to block the control passage 26, and a proportional solenoid 15c which, when energized, generates thrust against the spring 15b. By adjusting a current amount flowing through the proportional solenoid 15c, a valve opening pressure of the variable relief valve 15 can be adjusted.

A pressure in the common passage 24a upstream of the control passage 26 acts on the valve body 15a of the variable relief valve 15. A resultant force of thrust generated by the pressure in the common passage 24a and the thrust generated by the proportional solenoid 15c serves as a force for pushing the valve body 15a in a direction for opening the control passage 26. When the pressure in the common passage 24a exceeds the valve opening pressure of the variable relief valve 15, the resultant force of the thrust generated by the pressure in the common passage 24a and the thrust generated by the proportional solenoid 15c overcomes a biasing force of the spring 15b that biases the valve body 15a in the direction for blocking the control passage 26. Accordingly, the valve body 15a retreats such that the control passage 26 opens, and as a result, the working oil is allowed to move from the common passage 24a toward the tank 7. Conversely, the variable relief valve 15 does not open in response to a flow of working oil from the tank 7 toward the common passage 24a, and therefore the working oil is prevented from flowing in this direction.

By increasing the current amount supplied to the proportional solenoid 15c of the variable relief valve 15, the thrust generated by the proportional solenoid 15c can be increased. When the current amount supplied to the proportional solenoid 15c is set at a maximum, the valve opening pressure reaches a minimum, and conversely, when no current is supplied to the proportional solenoid 15c at all, the valve opening pressure reaches a maximum.

When the first direction control valve 9A takes the first position 90a and the second direction control valve 9B takes the second position 93b, the common passage 24a communicates with the rod side chamber 5 such that the pressure therein becomes equal to the pressure in the rod side chamber 5. When the first direction control valve 9A takes the second position 90b and the second direction control valve 9B takes the first position 93a, the common passage 24a communicates with the piston side chamber 6 such that the pressure therein becomes equal to the pressure in the piston side chamber 6.

A through hole 2a that communicates with the interior and the exterior of the cylinder 2 is provided in a position of the cylinder 2 that opposes the piston 3 when the piston 3 is positioned in a stroke center, i.e. a neutral position relative to the cylinder 2. The through hole 2a communicates with the tank 7 via the center passage 16, thereby connecting the cylinder 2 to the tank 7. Hence, the interior of the cylinder 2 communicates with the tank 7 via the center passage 16 except when the piston 2 opposes the through hole 2a so as to block the through hole 2a. The position in which the through hole 2a is drilled into the cylinder 2 matches the stroke center serving as the neutral position of the piston 3, and the neutral position of the piston 3 matches the center of the cylinder 2. However, the neutral position of the piston 3 is not limited to the center of the cylinder 2, and may be set as desired. Further, the through hole 2a is not limited to the neutral position of the piston 3, and may be provided in another position of the cylinder 2.

An opening/closing valve 28 that opens and blocks the center passage 16 is provided on midway of the center passage 16. The opening/closing valve 28 is a solenoid opening/closing valve. The opening/closing valve 28 includes a valve main body 29 having a communication position 29a in which the center passage 16 is open and a blocking position 29b in which the center passage 16 is blocked; a spring 30 that is configured to bias the valve main body 29 so as to position the valve main body 29 in the communication position 29a; and a solenoid 31 which, when energized, switches the valve main body 29 to the blocking position 29b against a biasing force of the spring 30. The opening/closing valve 28 may be an opening/closing valve that is opened and closed by manual operations, rather than a solenoid opening/closing valve.

Next, an operation of the actuator unit 1 will be described. First, a case in which the opening/closing valve 28 blocks the center passage 16 will be described.

When the center passage 16 is blocked, pressure does not escape from the center passage 16 into the tank 7 regardless of the position of the piston 3 relative to the cylinder 2 resulting from expansion and contraction of the actuator unit 1. In the actuator unit 1, the working oil discharged from the pump 8 can be supplied selectively to the rod side chamber 5 and the piston side chamber 6 by switching the positions of the direction control valves 9A, 9B such that the rod side chamber 5 and the piston side chamber 6 communicate selectively with the tank 7. As a result, the pressure in the rod side chamber 5 and the piston side chamber 6 communicating with the tank 7 can be set at a tank pressure. By adjusting the valve opening pressure of the variable relief valve 15, the pressure in the supply side chamber (the rod side chamber 5 or the piston side chamber 6) communicating with the pump 8 can be adjusted. Hence, by switching the positions of the direction control valves 9A, 9B so as to select the chamber (the supply side chamber) that supplies the working oil discharged from the pump 8 and the chamber (the non-supply side chamber) that is communicated with the tank 7, and then adjusting the pressure in the supply side chamber by adjusting the valve opening pressure of the variable relief valve 15, the direction and magnitude of the thrust generated by the actuator unit 1 can be controlled.

For example, when the actuator unit 1 is to be caused to output thrust in the expansion direction, the valve opening pressure of the variable relief valve 15 is adjusted while supplying the working oil to the piston side chamber 6 from the pump 8 by causing the first direction control valve 9A to take the second position 90b and causing the second direction control valve 9B to take the first position 93a. In this case, the pressure in the piston side chamber 6 is adjusted to the valve opening pressure of the variable relief valve 15, whereas the rod side chamber 5 communicates with the tank 7 via the first discharge passage 10A such that the pressure in the rod side chamber 5 is maintained at the tank pressure. Hence, by supplying the working oil discharged from the pump 8 to the piston side chamber 6 and adjusting the pressure in the piston side chamber 6 serving as the supply side chamber, the actuator unit 1 can be caused to generate desired thrust in the expansion direction.

When the actuator unit 1 is to be caused to output thrust in the contraction direction, the valve opening pressure of the variable relief valve 15 is adjusted while supplying the working oil to the rod side chamber 5 from the pump 8 by causing the first direction control valve 9A to take the first position 90a and causing the second direction control valve 9B to take the second position 93b. In this case, the pressure in the rod side chamber 5 is adjusted to the valve opening pressure of the variable relief valve 15, whereas the piston side chamber 6 communicates with the tank 7 via the second discharge passage 10B such that the pressure in the piston side chamber 6 is maintained at the tank pressure. Hence, by supplying the working oil discharged from the pump 8 to the rod side chamber 5 and adjusting the pressure in the rod side chamber 5 serving as the supply side chamber, the actuator unit 1 can be caused to generate desired thrust in the contraction direction.

To control the thrust of the actuator unit 1, therefore, it is sufficient to learn the relationship between the current amount applied to the proportional solenoid 15c of the variable relief valve 15 and the valve opening pressure thereof, and in so doing, open loop control can be performed. Alternatively, feedback control may be performed using a current loop by sensing an energization amount applied to the proportional solenoid 15c. Feedback control may also be performed by sensing the respective pressures in the rod side chamber 5 and the piston side chamber 6.

Further, when the actuator unit 1 is caused to function as a damper by cutting off the working oil supply from the pump 8, the first and second direction control valves 9A, 9B are caused to take the respective first positions 90a, 93a. When, in this case, the actuator unit 1 expands upon reception of an external force, since the check valve 25A is provided on the first branch passage 24b, the expansion side relief valve 21 is provided on the expansion side relief passage 19 provided in the piston 3, and the check valve 14 is provided on the expansion side intake passage 12 communicating the piston side chamber 6 with the tank 7, and therefor the pressure in the piston side chamber 6 reaches the tank pressure while the pressure in the rod side chamber 5 reaches a valve opening pressure of the expansion side relief valve 21. As a result, the actuator unit 1 can be caused to generate thrust in the contraction direction. Conversely, when the actuator unit 1 contracts upon reception of an external force, since the check valve 25B is provided on the second branch passage 24c, the contraction side relief valve 22 is provided on the contraction side relief passage 20 provided in the piston 3, and the check valve 13 is provided on the contraction side intake passage 11 communicating the rod side chamber 5 with the tank 7, and therefor the pressure in the rod side chamber 5 reaches the tank pressure while the pressure in the piston side chamber 6 reaches a valve opening pressure of the contraction side relief valve 22. As a result, the actuator unit 1 can be caused to generate thrust in the expansion direction.

Next, a case in which the opening/closing valve 28 allows communication of the center passage 16 will be described. First, a condition obtained in this case by driving the pump 8 and causing the first direction control valve 9A to take the second position 90b and the second direction control valve 9B to take the first position 93a so that the working oil is supplied to the piston side chamber 6 from the pump 8 while the pressure in the rod side chamber 5 is maintained at the tank pressure will be described. When, in this condition, the piston 3 moves leftward in FIG. 1, i.e. in the expansion direction, beyond the through hole 2a communicating with the center passage 16, the piston side chamber 6 communicates with the tank 7 via the center passage 16, and therefore the pressure in the piston side chamber 6 is also maintained at the tank pressure.

In this case, the pressure in both the rod side chamber 5 and the piston side chamber 6 equals the tank pressure, and therefore the piston 3 cannot be pushed either rightward or leftward in FIG. 1. Accordingly, the actuator unit 1 does not generate thrust in either the expansion direction or the contraction direction. This condition is maintained until the piston 3 opposes the through hole 2a so as to block the center passage 16. Hence, the actuator unit 1 does not generate thrust in the expansion direction until the piston 3 blocks the center passage 16 by stroking in the direction for causing the piston side chamber 6 to contract from a condition in which the piston 3 is leftward of the through hole 2a in the center passage 16 in FIG. 1.

Next, a condition in which the pump 8 is driven, the first direction control valve 9A is caused to take the first position 90a, and the second direction control valve 9B is caused to take the second position 93b such that the working oil is supplied to the rod side chamber 5 from the pump 8 while the pressure in the piston side chamber 6 is maintained at the tank pressure will be described. When, in this condition, the piston 3 moves rightward in FIG. 1, i.e. in the contraction direction, beyond the through hole 2a communicating with the center passage 16, the rod side chamber 5 also communicates with the tank 7 via the center passage 16, and therefore the pressure in the rod side chamber 5 likewise reaches the tank pressure.

In this case, the pressure in both the rod side chamber 5 and the piston side chamber 6 equals the tank pressure, and therefore the piston 3 cannot be pushed either rightward or leftward in FIG. 1. Accordingly, the actuator unit 1 does not generate thrust in either the expansion direction or the contraction direction. This condition is maintained until the piston 3 opposes the through hole 2a so as to block the center passage 16. Hence, the actuator unit 1 does not generate thrust in the contraction direction until the piston 3 blocks the center passage 16 by stroking in the direction for causing the rod side chamber 5 to contract from a condition in which the piston 3 is rightward of the through hole 2a in the center passage 16 in FIG. 1.

Next, a case in which the opening/closing valve 28 allows communicates of the center passage 16 in a condition where the actuator unit 1 is caused to function as a damper by cutting off the working oil supply from the pump 8 and causing the first and second direction control valves 9A, 9B to take the respective first positions 90a, 93a will be described. In this case, when the piston 3 is leftward, i.e. on the expansion direction side, of the through hole 2a communicating with the center passage 16 in FIG. 1 such that the actuator unit 1 performs an expansion operation, the piston side chamber 6 can be maintained at the tank pressure via the center passage 16 and the expansion side intake passage 12, and the pressure in the rod side chamber 5 can be adjusted to the valve opening pressure of the expansion side relief valve 21. Accordingly, the actuator unit 1 can generate thrust in the contraction direction against the expansion operation. On the other hand, when the actuator unit 1 performs a contraction operation, the first check valve 13 opens such that the pressure in the rod side chamber 5 reaches the tank pressure via the contraction side intake passage 11, while the piston side chamber 6 is likewise maintained at the tank pressure via the center passage 16. As a result, the actuator unit 1 does not generate thrust in the expansion direction. This condition is maintained until the piston 3 opposes the through hole 2a so as to block the center passage 16. Hence, the actuator unit 1 does not generate thrust in the expansion direction until the piston 3 blocks the center passage 16 by stroking in the direction for causing the piston side chamber 6 to contract from a condition in which the piston 3 is leftward of the through hole 2a in the center passage 16 in FIG. 1. When the piston 3 is rightward, i.e. on the contraction direction side, of the through hole 2a communicating with the center passage 16 in FIG. 1 such that the actuator unit 1 performs a contraction operation, the rod side chamber 5 can be maintained at the tank pressure via the center passage 16 and the contraction side intake passage 11, and the pressure in the piston side chamber 6 can be adjusted to the valve opening pressure of the contraction side relief valve 22. Accordingly, the actuator unit 1 can generate thrust in the expansion direction against the contraction operation. On the other hand, when the actuator unit 1 performs an expansion operation, the check valve 14 opens so as to allow communication of the contraction side intake passage 12, and therefore the piston side chamber 6 reaches the tank pressure while the rod side chamber 5 is likewise maintained at the tank pressure via the center passage 16. As a result, the actuator unit 1 does not generate thrust in the contraction direction. This condition is maintained until the piston 3 opposes the through hole 2a so as to block the center passage 16. Therefore, the actuator unit 1 does not generate thrust in the contraction direction until the piston 3 blocks the center passage 16 by stroking in the direction for causing the rod side chamber 5 to contract from a condition in which the piston 3 is rightward of the through hole 2a in the center passage 16 in FIG. 1.

In other words, in a case where the opening/closing valve 28 allows communication of the center passage 16, the actuator unit 1 can generate thrust only in a direction for returning the piston 3 to the center of the cylinder 2 while functioning as an actuator. While functioning as a damper, the actuator unit 1 generates thrust against the piston 3 only when the piston 3 strokes in a direction away from the center of the cylinder 2. Hence, regardless of whether the actuator unit 1 functions as an actuator or a damper, thrust is generated only in a direction for returning the piston 3 to the neutral position side both when the piston 3 is leftward and rightward of the neutral position in FIG. 1.

Figure 2:
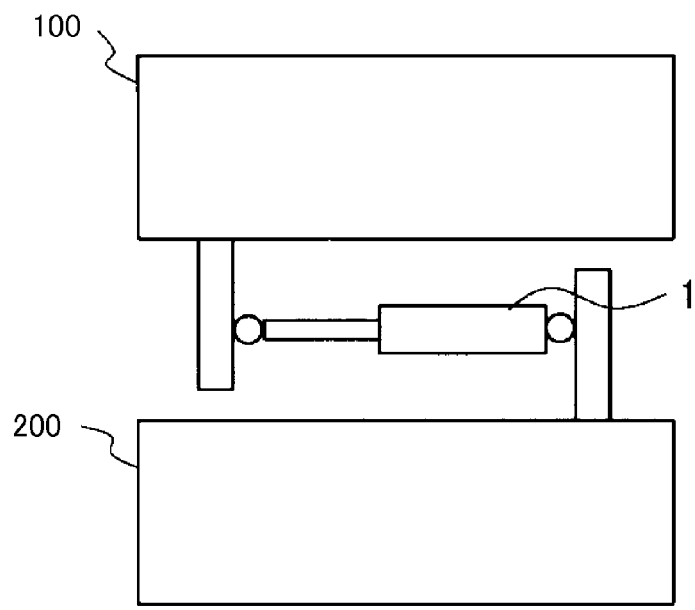
FIG. 2 is a view showing a condition in which the actuator unit according to this embodiment of the present invention is interposed between a vibration damping subject and a vibration input side unit.
Figure 3:
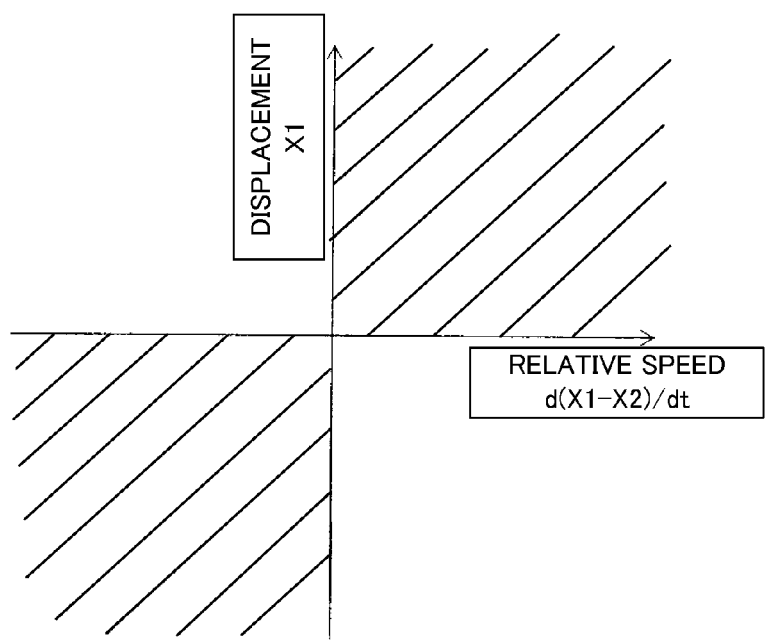
FIG. 3 is a view illustrating respective conditions in which the actuator unit according to this embodiment of the present invention does and does not generate thrust.
Figure 4:
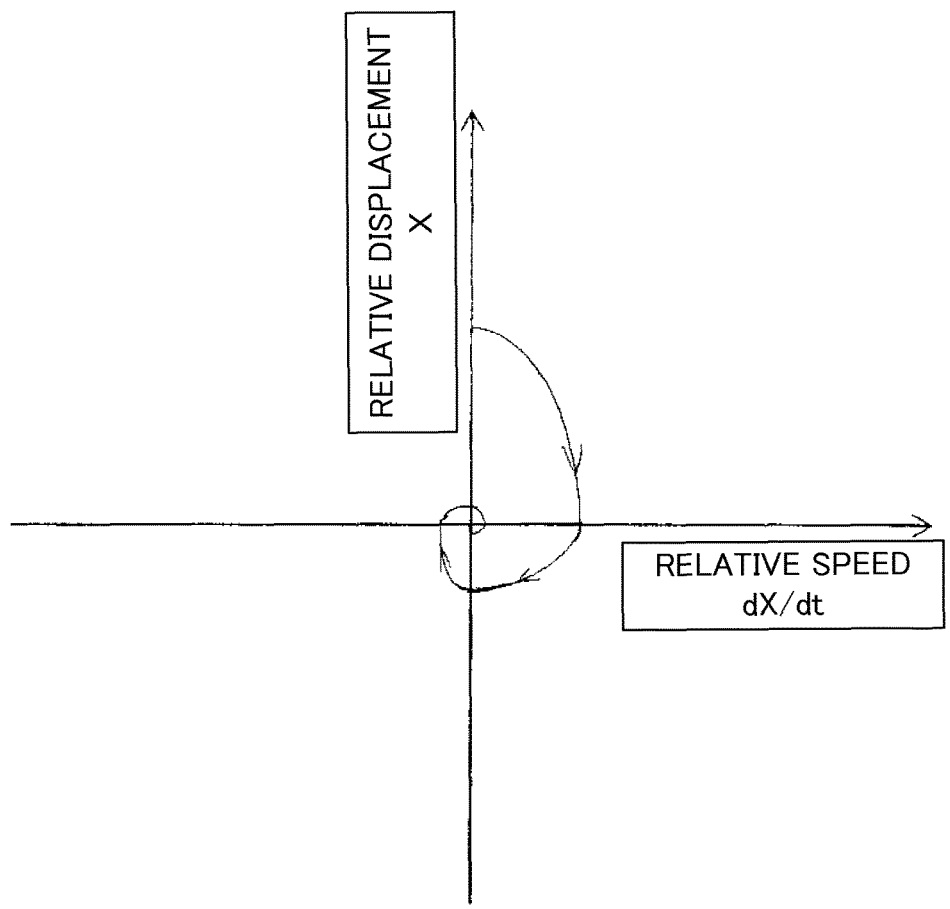
FIG. 4 is a view showing respective transitions of a relative displacement and a relative speed between the vibration damping subject and the vibration input side unit to which the actuator unit according to this embodiment of the present invention is applied.

Here, as shown in FIG. 2, a model in which the actuator unit 1 is interposed in a railway vehicle between a vehicle body serving as a vibration damping subject 100 and a bogie serving as a vibration input side unit 200 will be considered. In FIG. 2, left-right direction displacement of the vibration damping subject 100 is set as $X1$, and left-right direction displacement of the vibration input side unit 200 is set as $X2$. A relative speed between the vibration damping subject 100 and the vibration input side unit 200 is set as $d(X1-X2)/dt$. FIG. 3 is a view on which rightward displacement in FIG. 2 is taken as a positive value, the displacement $X1$ is shown on the ordinate, and the relative speed $d(X1-X2)/dt$ is shown on the abscissa. As shown in FIG. 3, the actuator unit 1 generates damping force in a first quadrant and a third quadrant, which are shaded in the figure. This is equivalent to an increase in an apparent rigidity of the actuator unit 1 when the actuator unit 1 generates thrust and a reduction in the apparent rigidity when the actuator unit 1 does not generate thrust. FIG. 4 is a view on which relative displacement occurring between the vibration input side unit 200 and the vibration damping subject 100 when the vibration damping subject 100 displaces relative to the vibration input side unit 200 is set as $X$, and the relative speed is set as $dX/dt$. As shown in FIG. 4, on a phase plane of the relative displacement $X$ and the relative speed $dX/dt$, a vibration trajectory is absorbed into the origin, thereby becoming asymptotically stable, and as a result, the vibration does not diverge.

In the actuator unit 1 according to this embodiment, as described above, the center passage 16 is provided, thrust to assist the separating of the piston 3 from the neutral position is not generated. This makes it possible to absorb vibration easily. As a result, vibration of the vibration damping subject 100 can be suppressed with stability. When the actuator unit is used between a vehicle body and a truck of a railway vehicle, for example, and the railway vehicle travels in a curved section, steady acceleration acts on the vehicle body, and therefore the thrust output by the actuator unit may become extremely large due to effects from noise and drift input into an acceleration sensor. In such cases, with the actuator unit 1, thrust for assisting the piston 3 in separating from the neutral position is not generated when the piston 3 passes the neutral position. In other words, a situation in which the vehicle body passes the neutral position such that vibration is applied thereto does not occur, and therefore vibration is absorbed easily, leading to an improvement in passenger comfort in the railway vehicle.

In the actuator unit 1, there is no need to control the variable relief valve 15 in conjunction with the stroke of the actuator unit 1 for realizing the operation described above. Accordingly, a stroke sensor is also unnecessary, and therefore vibration suppression can be achieved without relying on a sensor output that includes errors. Hence, vibration suppression with highly robustness can be realized.

Further, in the actuator unit 1, the working oil discharged from the pump 8 can be supplied selectively to the rod side chamber 5 and the piston side chamber 6 by the direction control valves 9A, 9B. Hence, there is no need to provide two pumps, i.e. a pump to supply the working oil to the rod side chamber 5 and a pump to supply the working oil to the piston side chamber 6. Further, the pressure in the rod side chamber 5 and the pressure in the piston side chamber 6 can be adjusted by the single variable relief valve 15, making it unnecessary to provide two variable relief valves, i.e. a variable relief valve to adjust the pressure in the rod side chamber 5 and a variable relief valve to adjust the pressure in the piston side chamber 6. As a result, an increase in the size of the actuator unit 1 can be suppressed, and the configuration thereof can be simplified.

Furthermore, the actuator unit 1 includes the contraction side intake passage 11 and the expansion side intake passage 12 provided respectively with the check valves 13, 14, and therefore, even when the working oil supply from the pump 8 is cut off, working oil can be supplied from the tank 7 to the chamber that expands when the actuator unit 1 expands and contracts, from among the rod side chamber 5 and the piston side chamber 6. The actuator unit 1 also includes the expansion side relief passage 19 that communicates the rod side chamber 5 with the piston side chamber 6 and is provided with the expansion side relief valve 21, and the contraction side relief passage 20 that communicates the rod side chamber 5 with the piston side chamber 6 and is provided with the contraction side relief valve 22, and therefore, when the supply from the pump 8 is cut off such that the actuator unit 1 is caused to function as a damper, the actuator unit 1 can be caused to generate a damping force from the resistance of the expansion side relief valve 21 and the contraction side relief valve 22. Likewise in this case, thrust for assisting the piston 3 in separating from the neutral position is not generated when the piston 3 passes the neutral position.

Moreover, the actuator unit 1 is provided with the opening/closing valve 28, and therefore the center passage 16 can be switched between a communicated condition and a blocked condition. By blocking the center passage 16, the actuator unit 1 can be caused to function as a typical actuator that is capable of generating thrust in both directions over the entire stroke, leading to an increase in versatility. When necessary, the center passage 16 may be opened such that stable vibration suppression is realized. For example, vibration may be suppressed by opening the center passage 16 when low frequency vibration or low frequency, high wave height vibration is input, and in so doing, there is no need to switch a control mode in order to suppress vibration when the center passage 16 is opened or closed. In other words, when vibration suppression is underway on the vibration damping subject 100 in a certain control mode such as skyhook control or H-infinity control, there is no need to modify the control mode after opening or closing the center passage 16, and therefore the need for complicated control is eliminated.

Further, the opening/closing valve 28 is set in the communication position 29a when not energized, and therefore stable vibration suppression can be performed during a failure by opening the center passage 16. The opening/closing valve 28 may be set to take the blocking position 29b when power cannot be supplied thereto. When the opening/closing valve 28 takes the communication position 29a, resistance may be applied to the flow of working oil passing through.

In the actuator unit 1, the opening position of the center passage 16 is in the center of the cylinder 2 in a position opposing the stroke center of the piston 3. Hence, there is no bias in either direction in a stroke range in which damping force is not generated when the piston 3 is returned to the stroke center, and therefore the entire stroke length of the actuator unit 1 can be used effectively.

In the above embodiment, the vibration damping subject 100 and the vibration input side unit 200 were described as a vehicle body and a truck of a railway vehicle. However, the actuator unit 1 is not limited to be used in a railway vehicle, and may be used in other applications for suppressing vibration, such as between a building and a foundation or the like.

Embodiments of this invention were described above, but the above embodiments are merely examples of applications of this invention, and the technical scope of this invention is not limited to the specific constitutions of the above embodiments.

Figure 5:
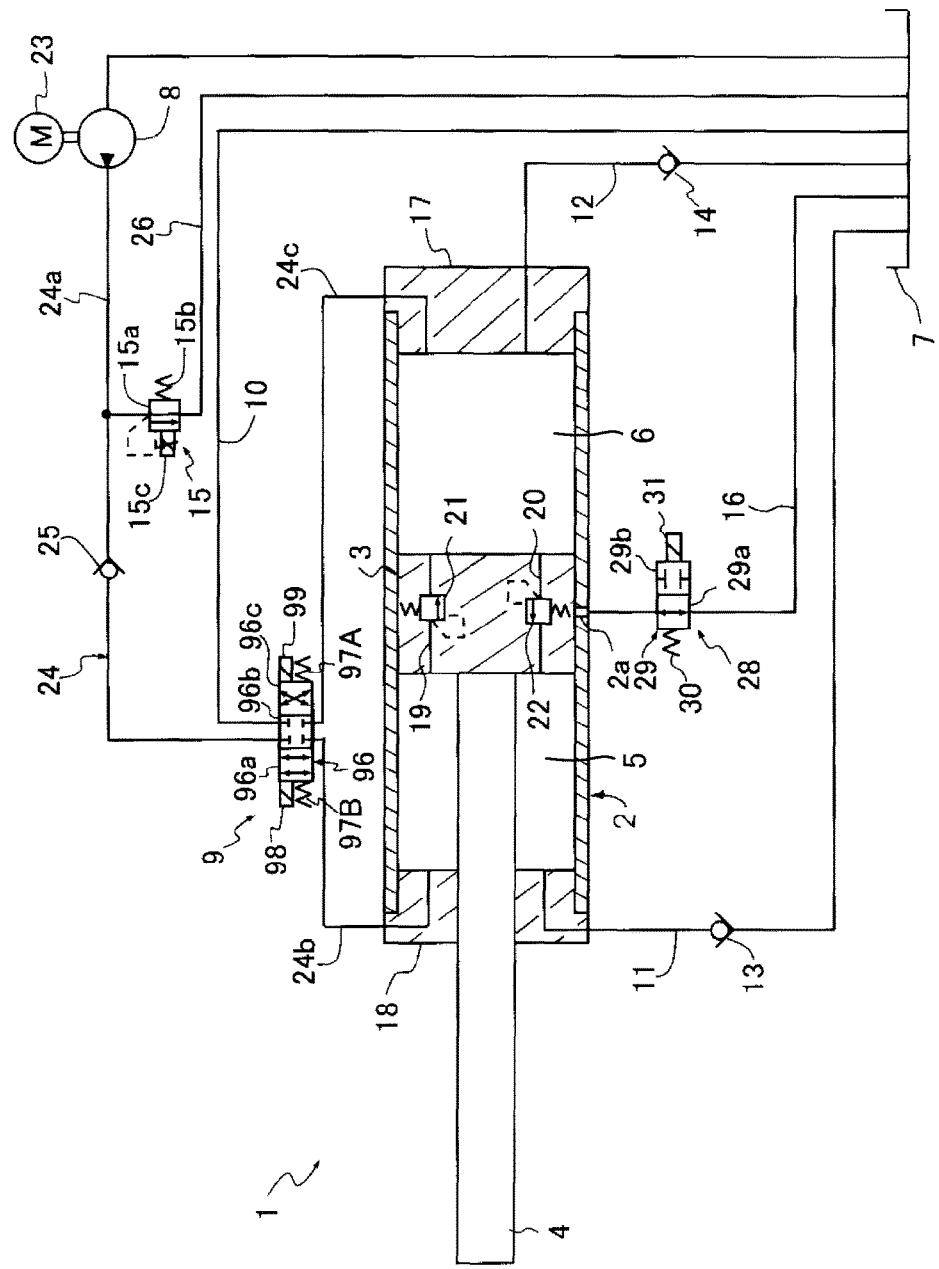
FIG. 5 is a schematic view of the actuator unit according to this embodiment of the present invention, showing a modified example of a direction control valve.

For example, in the above embodiment, the direction control valves 9A, 9B are provided respectively in the first branch passage 24b and the second branch passage 24c of the supply passage 24, and the discharge passages 10A, 10B that communicate with the tank 7 are connected respectively to the direction control valves 9A, 9B. Instead, however, as shown in FIG. 5, one direction control valve 9 may be provided at a terminal end of the common passage 24a serving as a branch part where the first branch passage 24b and the second branch passage 24c branch from the supply passage 24, and a discharge passage 10 that communicates with the tank 7 may be connected to the direction control valve 9.

In this case, the direction control valve 9 is a solenoid direction control valve that includes a valve main body 96 having a first communication position 96a, a blocking position 96b, a second communication position 96c, the common passage 24a communicating with the first branch passage 24b and the discharge passage 10 communicating with the second branch passage 24c at the first communication position 96a, none of the passages communicating with each other at blocking position 96b, the common passage 24a communicating with the second branch passage 24c and the discharge passage 10 communicating with the first branch passage 24b; a pair of springs 97A, 97B that is configured to bias the valve main body 96 from both sides so as to position the valve main body 96 in the blocking position 96b; a first solenoid 98 which, when energized, switches the valve main body 96 to the first communication position 96a against a biasing force of the spring 97A; and a second solenoid 99 which, when energized, switches the valve main body 96 to the second communication position 96c against a biasing force of the spring 97B. The direction control valve 9 therefore takes the blocking position 96b when not energized.

In this case, when the actuator unit 1 is caused to generate thrust in the expansion direction while functioning as an actuator, the direction control valve 9 is caused to take the second communication position 96c so that the working oil is supplied to the piston side chamber 6 from the pump 8 and the rod side chamber 5 communicates with the tank 7. When the actuator unit 1 is caused to generate thrust in the contraction direction, on the other hand, the direction control valve 9 is caused to take the first communication position 96a so that the working oil is supplied to the rod side chamber 5 from the pump 8 and the piston side chamber 6 communicates with the tank 7. Further, when the actuator unit 1 is caused to function as a damper, the supply from the pump 8 is cut off so that the direction control valve 9 is caused to take the blocking position 96b.

By providing the actuator unit 1 with the configuration described above, the two direction control valves 9A, 9B can be reduced to a single valve, and the discharge passages 10A, 10B communicating with the direction control valve 9 can be reduced to a single passage. As a result, the configuration of the actuator unit 1 can be simplified. Furthermore, in this case, the direction control valve 9 shown in FIG. 5 includes the two unidirectionally operated solenoids 98, 99, but a single bidirectionally operated solenoid may be provided instead.

This application claims priority based on Japanese Patent Application No. 2013-028534 filed with the Japan Patent Office on Feb. 18, 2013, the entire contents of which are incorporated into this specification.

The invention claimed is:
1. An actuator unit, comprising:
a cylinder;
a piston slidably inserted into the cylinder, the piston defining two chambers in the cylinder;
a rod inserted into the cylinder and coupled to the piston;
a tank;
a pump;
a supply passage provided between the pump and each of the two chambers so as to allow a working fluid discharged from the pump to be supplied to the two chambers;
a discharge passage provided between each of the two chambers and the tank so as to allow the two chambers to communicate with the tank;
a direction control valve configured to selectively communicate each of the two chambers with one of the pump and the tank by allowing and blocking communication between the corresponding chambers and one of the supply passage and the discharge passage;
a control passage that branches from the supply passage between the pump and the direction control valve so as to communicate the pump with the tank;
a variable relief valve provided on the control passage, the variable relief valve being configured to have a varied valve opening pressure, the variable relief valve opening so as to allow the working fluid to flow from the supply passage toward the tank when a pressure in the supply passage reaches the valve opening pressure; and
a center passage that communicates the tank with an interior of the cylinder via a through hole through the cylinder,
wherein a length of the through hole in an axial direction of the cylinder is smaller than a length of the piston facing an inner surface of the cylinder in the axial direction of the cylinder, and the through hole is closed by the piston when the piston moves on the through hole,
wherein the center passage opens onto the cylinder only at the through hole aligned with a stroke center of the piston, wherein the two chambers include a rod-side chamber and a piston-side chamber, and
wherein the cylinder, the center passage, and an opening/closing valve are configured such that thrust is provided only in a direction for returning the piston to the stroke center side both when the piston is leftward and rightward of the stroke center.

2. The actuator unit according to claim 1, wherein the supply passage includes:
a common passage that communicates with a discharge port of the pump;
a first branch passage that branches from the common passage so as to communicate with one of the two chambers; and
a second branch passage that branches from the common passage so as to communicate with the other of the two chambers,
wherein the direction control valve includes:
a first direction control valve provided on the first branch passage; and
a second direction control valve provided in the second branch passage, wherein the discharge passage includes:
a first discharge passage connected to the first direction control valve so as to communicate one of the two chambers with the tank; and
a second discharge passage connected to the second direction control valve so as to communicate the other of the two chambers with the tank,
wherein the first direction control valve has a first position and a second position so as to be capable of switching between the first position and the second position, communication between the first branch passage being opened and the first discharge passage being closed at the first position, the first branch passage being closed and the first discharge passage being opened at the second position,
wherein the second direction control valve has a first position and a second position so as to be capable of switching between the first position and the second position, the second branch passage being opened and the second discharge passage being closed at the first position, the second branch passage being closed and the second discharge passage being opened at the second position, and
wherein check valves allowing the working fluid to flow only from the pump toward the cylinder are respectively provided on the first branch passage and the second branch passage between the pump and the first and second direction control valves.

3. The actuator unit according to claim 1, wherein the supply passage includes:
a common passage that communicates with a discharge port of the pump;
a first branch passage that branches from the common passage so as to communicate with one of the two chambers; and
a second branch passage that branches from the common passage so as to communicate with the other of the two chambers,
wherein the direction control valve is provided in a bifurcating part of the supply passage, and the discharge passage communicating with the tank is connected to the direction control valve, and
wherein the direction control valve has a first communication position, a blocking position, and a second communication position so as to be capable of switching among the first communication position, the blocking position, and the second communication position, the common passage communicating with the first branch passage and the discharge passage communicating with the second branch passage at the first communication position, none of the passages communicating with each other at the blocking position, the common passage communicating with the second branch passage and the discharge passage communicating with the first branch passage at the second position.

4. The actuator unit according to claim 1, further comprising:
- a contraction side intake passage that communicates the tank with a rod side chamber of the two chambers, the rod side chamber expanding when the actuator unit contracts;
- an expansion side intake passage that communicates the tank with a piston side chamber of the two chambers, the piston side chamber expanding when the actuator unit expands;
- a check valve provided on the contraction side intake passage to allow the working fluid to pass only from the tank toward the rod side chamber;
- a check valve provided on the expansion side intake passage to allow the working fluid to pass only from the tank toward the piston side chamber;
- an expansion side relief passage and a contraction side relief passage each of which communicates the rod side chamber with the piston side chamber;
- an expansion side relief valve provided on the expansion side relief passage so as to open when a pressure in the rod side chamber exceeds a pressure in the piston side chamber by a predetermined amount; and
- a contraction side relief valve provided on the contraction side relief passage so as to open when the pressure in the piston side chamber exceeds the pressure in the rod side chamber by a predetermined amount.

5. The actuator unit according to claim 1, wherein the center passage opens onto the cylinder at a position aligning with a stroke center of the piston.

6. The actuator unit according to claim 1, wherein an opening/closing valve is provided on the center passage to open and close the center passage.

7. The actuator unit according to claim 1, wherein the thrust is provided only in the direction for returning the piston to the stroke center side regardless of whether the actuator unit functions as an actuator or a damper.

8. An actuator unit, comprising:
- a cylinder;
- a piston slidably inserted into the cylinder, the piston defining two chambers in the cylinder;
- a rod inserted into the cylinder and coupled to the piston;
- a tank;
- a pump;
- a supply passage provided between the pump and each of the two chambers so as to allow a working fluid discharged from the pump to be supplied to the two chambers;
- a discharge passage provided between each of the two chambers and the tank so as to allow the two chambers to communicate with the tank;
- a direction control valve configured to selectively communicate each of the two chambers with one of the pump and the tank by allowing and blocking communication between the corresponding chambers and one of the supply passage and the discharge passage;
- a control passage that branches from the supply passage between the pump and the direction control valve so as to communicate the pump with the tank;
- a variable relief valve provided on the control passage, the variable relief valve being configured to have a varied valve opening pressure, the variable relief valve opening so as to allow the working fluid to flow from the supply passage toward the tank when a pressure in the supply passage reaches the valve opening pressure; and
- a center passage that communicates the tank with an interior of the cylinder via an only one through hole through the cylinder,
wherein a length of the only one through hole in an axial direction of the cylinder is smaller than a length of the piston facing an inner surface of the cylinder in the axial direction of the cylinder, and the only one through hole is closed by the piston when the piston moves on the only one through hole.

* * * * *